(12) United States Patent  
Klein et al.

(10) Patent No.: US 11,027,773 B2
(45) Date of Patent: Jun. 8, 2021

(54) STEER BY WIRE SYSTEM DIAGNOSTIC

(71) Applicant: STEERING SOLUTIONS IP HOLDING CORPORATION, Saginaw, MI (US)

(72) Inventors: Steven D. Klein, Munger, MI (US); Kai Zheng, Midland, MI (US); Scott T. Sanford, Swartz Creek, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 333 days.

(21) Appl. No.: 16/134,126

(22) Filed: Sep. 18, 2018

(65) Prior Publication Data

US 2019/0084614 A1 Mar. 21, 2019

Related U.S. Application Data

(60) Provisional application No. 62/561,262, filed on Sep. 21, 2017.

(51) Int. Cl.
*B62D 5/04* (2006.01)
*B62D 5/00* (2006.01)
*B62D 6/00* (2006.01)
*G07C 5/08* (2006.01)

(52) U.S. Cl.
CPC .......... *B62D 5/0481* (2013.01); *B62D 5/001* (2013.01); *B62D 5/0421* (2013.01); *B62D 5/0442* (2013.01); *B62D 6/002* (2013.01); *G07C 5/0808* (2013.01)

(58) Field of Classification Search
None
See application file for complete search history.

(56) References Cited

U.S. PATENT DOCUMENTS

2004/0128042 A1* 7/2004 Takahashi ............ B62D 5/0403 701/41
2020/0269912 A1* 8/2020 Lapis .................... B62D 5/001

FOREIGN PATENT DOCUMENTS

| CN | 102975766 A | 3/2013 |
| CN | 205381303 U | 7/2016 |
| CN | 106004997 A | 10/2016 |
| CN | 106515843 A | 3/2017 |

(Continued)

OTHER PUBLICATIONS

First Chinese Office Action and Search report from the China National Intellectual Property Administration (CNIPA) for related Chinese Patent Application No. 201811110228.0 dated Sep. 21, 2020.

*Primary Examiner* — Lail A Kleinman
(74) *Attorney, Agent, or Firm* — Dickinson Wright PLLC

(57) ABSTRACT

According to one or more embodiments a steer by wire steering system includes a handwheel actuator that provides a commanded position for a rack of a vehicle. The steer by wire steering system further includes a roadwheel actuator that moves the rack to a rack position based on the commanded position from the handwheel actuator. The steer by wire steering system further includes a diagnostic apparatus to compute a reference position based on the commanded position, and to compute a reference tracking error based on a difference between the reference position and the rack position. The diagnostic apparatus further determines a fault condition with the steer by wire system using the reference tracking error.

20 Claims, 7 Drawing Sheets

(56) References Cited

FOREIGN PATENT DOCUMENTS

| | | |
|---|---|---|
| CN | 206493992 U | 9/2017 |
| JP | 2009166674 A | 7/2009 |
| KR | 20140118145 A | 10/2014 |
| KR | 20170086980 A | 7/2017 |

* cited by examiner

STEER BY WIRE SYSTEM DIAGNOSTIC

CROSS REFERENCE TO RELATED APPLICATION

This application is a continuation of U.S. Provisional Application No. 62/561,262, filed Sep. 21, 2017, which is incorporated in its entirety herein.

BACKGROUND

An electric power steering (EPS) typically includes components such as steering wheel, column, rack-pinion gear, electric motor actuator etc. The EPS helps the driver to steer a vehicle by providing necessary torque assist. The assist torque is based on driver's applied torque. In a steady-state sense, the driver torque and assist torque counter the rack force generated because of tire-road interaction.

A typical steer by wire (SbW) system includes a roadwheel actuator (RWA) unit and handwheel (or steering wheel) actuator (HWA) unit. Unlike the EPS, the two units in the SbW are mechanically disconnected and communicate through controlled area network (CAN) interface (or other similar digital communication protocols). The HWA unit receives a rack force signal from the RWA unit to generate an appropriate torque feel for the driver. Alternatively, the handwheel angle and vehicle speed can also be used to generate desired torque feel to the driver. The angle from HWA unit is sent to the RWA unit which performs position control to control rack travel.

SUMMARY

According to one or more embodiments a steer by wire steering system includes a handwheel actuator that provides a commanded position for a rack of a vehicle. The steer by wire steering system further includes a roadwheel actuator that moves the rack to a rack position based on the commanded position from the handwheel actuator. The steer by wire steering system further includes a diagnostic apparatus to compute a reference position based on the commanded position, and to compute a reference tracking error based on a difference between the reference position and the rack position. The diagnostic apparatus further determines a fault condition with the steer by wire system using the reference tracking error.

According to one or more embodiments, a method for performing a diagnostic for a steer by wire steering system includes sending, by a handwheel actuator, a commanded position for receipt by a roadwheel actuator. The method further includes positioning, by the roadwheel actuator, a rack to a rack position based on the commanded position. The method further includes computing, by a diagnostic apparatus, a reference position based on the commanded position. The method further includes computing, by the diagnostic apparatus, a reference tracking error based on a difference between the reference position and the rack position. The method further includes determining, by the diagnostic apparatus, a fault condition with the steer by wire system using the reference tracking error.

According to one or more embodiments a computer program product includes a memory storage device having computer executable instructions stored therein, the computer executable instructions when executed by one or more processing units cause the processing units to perform diagnostic of a steer by wire steering system. Performing the diagnostic includes positioning, by a roadwheel actuator, a rack to a rack position based on a commanded position from a handwheel actuator. Performing the diagnostic further includes computing a reference position based on the commanded position. Performing the diagnostic further includes computing a reference tracking error based on a difference between the reference position and the rack position. Performing the diagnostic further includes determining a fault condition with the steer by wire system using the reference tracking error.

These and other advantages and features will become more apparent from the following description taken in conjunction with the drawings.

DETAILED DESCRIPTION

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The present application is generally related to steering systems, and particularly describes one or more techniques for a SbW system to recognize occurrence of an error such that it is acceptable to continue operation versus occurrence of an error which may be a fault condition requiring an alternate system response.

Figure 1:
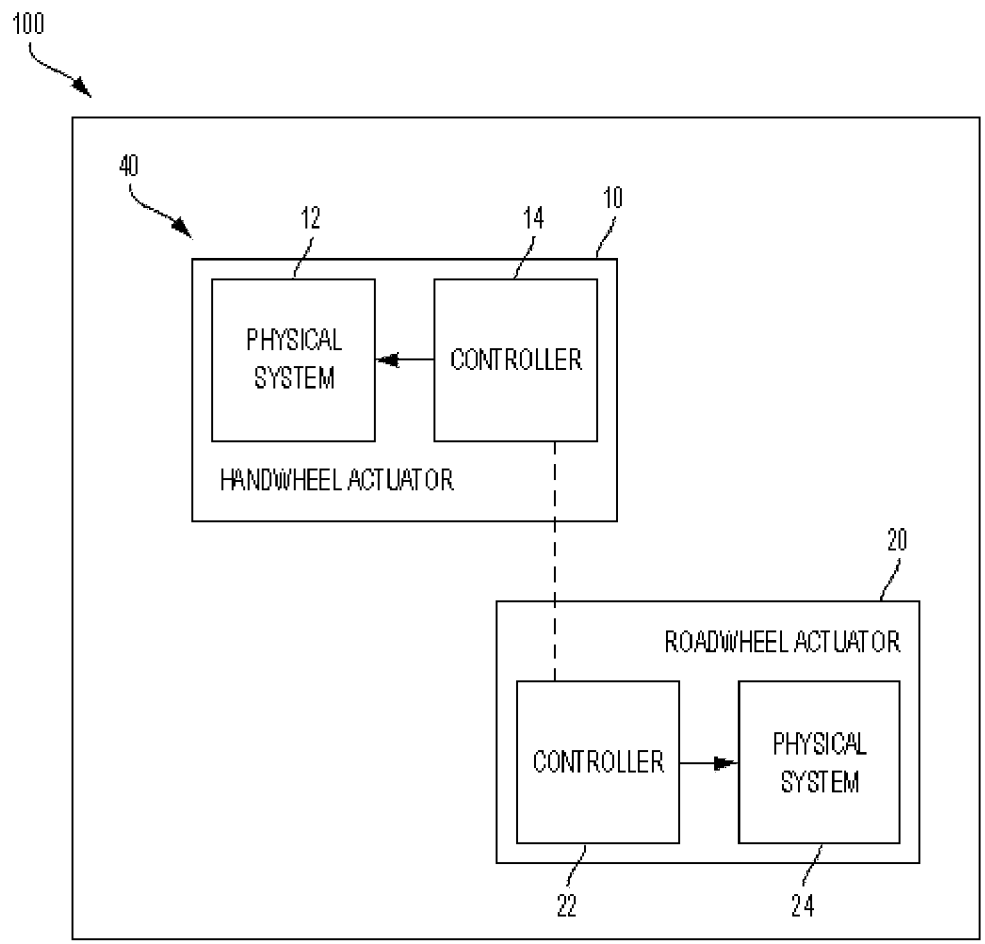
FIG. 1 is an exemplary embodiment of a steer by wire steering system according to one or more embodiments.

Referring now to the Figures, where the invention will be described with reference to specific embodiments, without limiting same, a SbW system 40 in a vehicle 100 is depicted in FIG. 1. It will be appreciated that the SbW system 40 shown and described can be used in an autonomous or semi-autonomous vehicle or in a more conventional vehicle. It is understood that the SbW 40 depicted is an exemplary block diagram and that in one or more embodiments, the SbW system 40 can include addition components than those depicted here. The SbW system 40 includes a handwheel actuator (HWA) 10 and a roadwheel actuator (RWA) 20.

The HWA 10 includes one or more mechanical components 12, such as a handwheel (steering wheel), a steering column, a motor/inverter attached to the steering column either through a gear mechanism or a direct drive system. The HWA 10 further includes a microcontroller 14 that controls the operation of the mechanical components 12. The microcontroller 14 receives and/or generates torque via the one or more mechanical components 12.

The RWA includes one or more mechanical components 24, such as a steering rack and/or pinion coupled to a motor/inverter through a ball-nut/ball-screw (gear) arrangement, and the rack is connected to the vehicle road wheels/tires through tie-rods. Accordingly, the physical system 24 can include one or more road wheels of the vehicle 100. The RWA 20 includes a microcontroller 22 that controls the operation of the mechanical components 24. The microcontroller 22 receives and/or generates torque via the one or more mechanical components 24.

The microcontrollers 14 and 22 are coupled through electrical connections that allow signals to be transmitted/received. As referred to herein, a controller can include a combination of the HWA controller 14 and the RWA controller 22, or any one of the specific microcontrollers.

In one or more examples, the controllers 14 and 22 SbW system 40 communicate with each other through CAN interface (or other similar digital communication protocols). Guidance of the vehicle 100 that is fitted with the SbW system 40 is performed by use of the steering gear, with an input shaft that is rotated by the RWA 20, such as a servo actuator. The RWA 20 receives an electronic communication signal of rotation of the steering wheel by the driver. A driver controls the steering wheel to directionally control the vehicle 100. The angle from HWA 10 is sent to the RWA 20 which performs position control to control rack travel to guide the roadwheel. However, due to the lack of mechanical connection between the steering wheel and the road wheels, the driver is not provided with a feel for the road without torque feedback (unlike the case in an EPS as described earlier).

In one or more examples, the HWA 10 that is coupled to the steering column and steering wheel simulates the driver's feel of the road. The HWA 10 may apply tactile feedback in the form of torque to the steering wheel. The HWA 10 receives a rack force signal from the RWA 20 to generate an appropriate torque feel for the driver. Alternatively, the handwheel angle and vehicle speed can also be used to generate desired torque feel to the driver.

The HWA 10 and the RWA 20 typically have a 'steering ratio' that determines how much the roadwheel changes position when a corresponding change in position is made in the handwheel of the SbW system 40. In a steering system that has a mechanical linkage between the handwheel and the roadwheel, a gear maintains this ratio. In the SbW system 40, the steering ratio is a predetermined value. However, in the SbW system 40, it is possible that the desired steering ratio may not be maintained at all times. There are several common situations that might cause this to occur. Examples include exceeding the velocity capability of the RWA 20 during a rapid driver input, handwheel angle input requiring roadwheel actuation past a travel stop, excess load on the RWA 20 (above a predetermined maximum threshold), initialization issues, and the like.

Not achieving the desired steering ratio has a number of undesired effects in the vehicle 100. Probably the biggest negative effect is that the SbW system 40 continues trying to move the roadwheel according to the desired steering ratio after the driver ceases to actuate the handwheel. This causes a significant lag in the vehicle 100 response and can make it appear that the vehicle 100 has continued to steer by itself.

Because the two systems, the HWA 10 and the RWA 20, are not linked mechanically, the lag between the two systems can result in an error to exist between the desired steering angle of the driver and the actual steering angle at the road wheels. This error can be generated by the driver steering the HWA 10 quicker than a capability of the RWA 20 to steer the road wheels, or the error can exist due to a fault condition of one or both systems. Because it is important to maintain full operation of the SbW system 40, a technical challenge exists to recognize an error which is acceptable to continue operation of the SbW system 40 versus an error which may be a fault condition requiring an alternate system response.

The technical solutions described herein address the technical challenges described above and facilitates maximizing the response of the RWA 20, and rejecting excessive error between the HWA 10 and the RWA 20 when the error is deemed to be of type where the SbW operation can be continued. The technical solutions described herein further facilitate maintaining diagnostic capability of the SbW system to recognize when the error condition is abnormal and so that a fault response is initiated.

Figure 2:
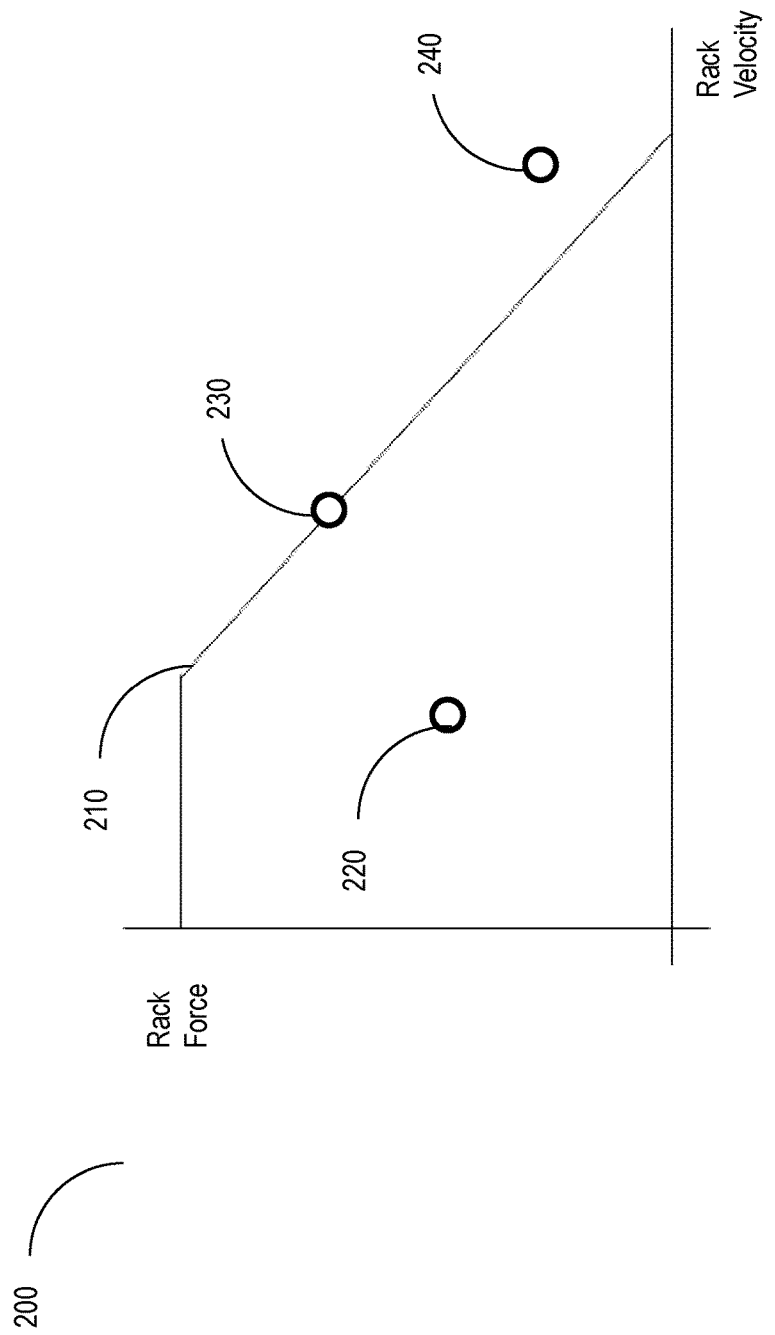
FIG. 2 depicts a plot that represents a rack force vs rack velocity of the RWA according to one or more embodiments.

FIG. 2 depicts a plot that represents a rack force vs rack velocity of the RWA 20 according to one or more embodiments. A curve 210 depicts a capability of the RWA 20 to change the roadwheel position synchronously with a command received by the RWA 20 from the HWA 10. The command from the HWA 10 can be an angle indicative of an amount of angle applied by the driver at the physical system 12, such as at the steering wheel. The capability of the RWA 20 to synchronously change the roadwheel position in response further depends on a rack velocity, which depicts an velocity of a motor or drive system of the RWA 20. For commands below or on the curve 210, such as the command 220 and the command 230, the RWA 20 generates the desired response, i.e. positions the road wheels synchronously with a change in an angle of the steering wheel of the vehicle according to the steering ratio. For commands outside of the bounds depicted by the curve 210, such as a command 240, the RWA 20 responds with performance below the desired performance, where the road wheel(s) are positioned at a position that does not match a change in position of the steering wheel according to the steering ratio.

There are two conditions of operation which need to be considered. First, the HWA 10 "out-running" the RWA 20: Here, because the RWA 20 is limited in the rack force and rack velocity (FIG. 2), the driver can steer the steering wheel or any other physical system 12 of the HWA 10, more quickly than what the RWA 20 can synchronously maintain. This condition is referred to as the HWA 10 "out-running" the RWA 20. It is understood that this condition may be referred to using any other term. The "out-running" is a function of system sizing (e.g. steering ratio, or other tuning parameters), but it does not represent a "fault" condition, rather a limit condition of the SbW system 40. In such cases, the SbW system 40 should remain fully operational during the out-run condition.

A second condition is the fault condition. Here, the driver's intent as represented in the change in the physical system 12 of the HWA 10 and the actual positioning of the RWA 20 differ due to an undesired fault condition. In this case, the SbW system 40 has to recognize the fault condition and respond appropriately.

To address this technical challenge, the technical solutions described herein distinguish the difference between the first condition of "out-running" and the second condition of the fault condition. The technical solutions described herein evaluate an error in position of the road wheel as configured by the RWA 20 and the position that is commanded by the HWA 10. While doing this, the SbW system 40 ignores the 'normal' condition of position error caused by the HWA 10 out-running the RWA 20.

The technical solutions described herein accordingly reject the 'normal' error of the out-running condition while recognizing the fault condition. To do this, the technical solutions described herein facilitate a diagnostic that accounts for the RWA force and velocity limitations in the evaluation of position error.

Figure 3:
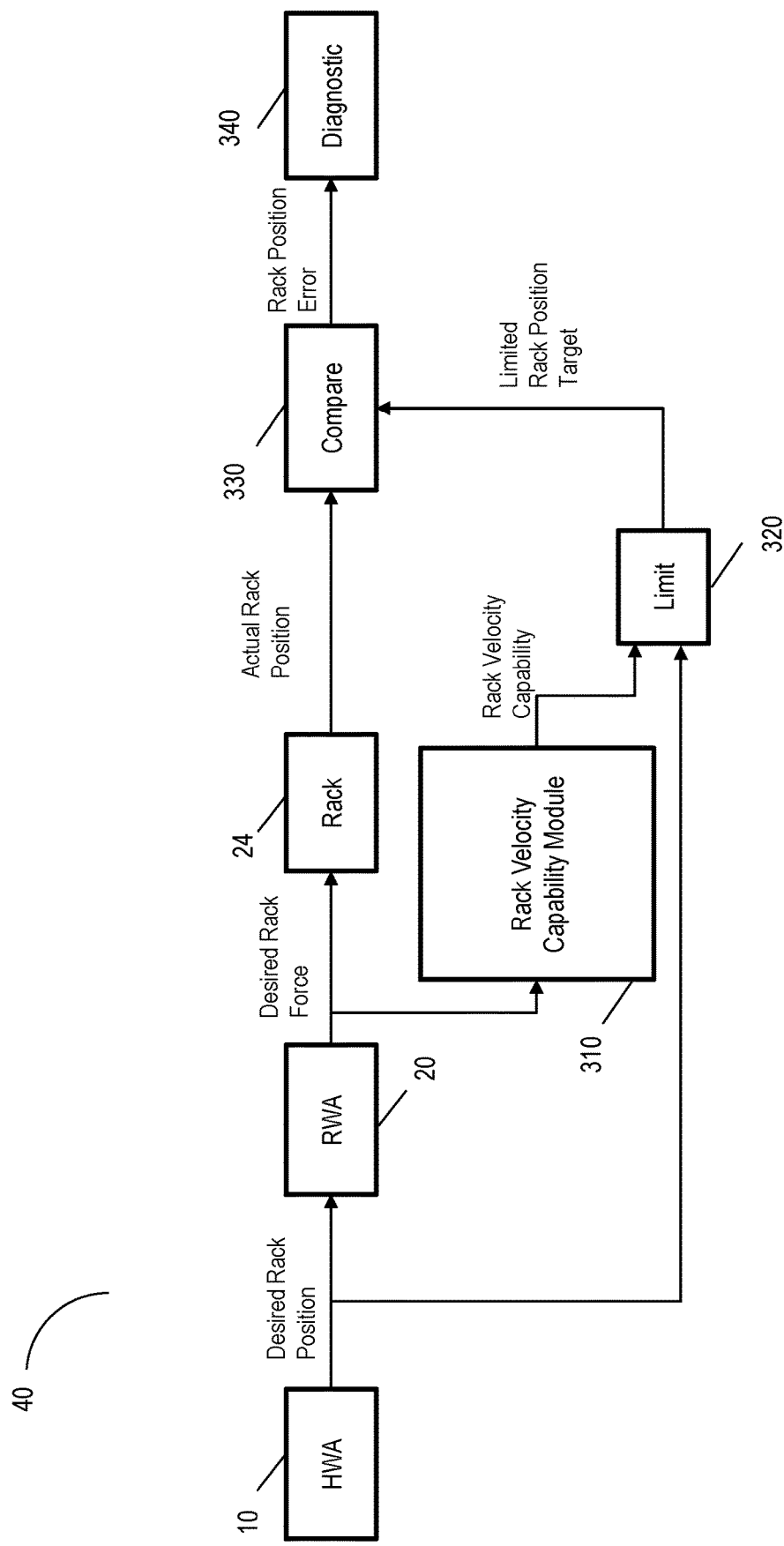
FIG. 3 depicts a block diagram of the example SbW system that provides a diagnostic according to one or more embodiments of the technical solutions described herein.

FIG. 3 depicts a block diagram of the example SbW system 40 that provides a diagnostic according to one or more embodiments of the technical solutions described herein. Along with the HWA 10, the RWA 20, and the physical system 24 (labelled rack), the depicted SbW system 40 includes a rack velocity capability module 310, a limit block 320, a compare block 330, and a diagnostic block 340. The rack velocity capability module 310, the limit block 320, the compare block 330, and the diagnostic block 340, can together be considered a diagnostic apparatus that performs a diagnostic of the SbW system 40. It should be noted that the blocks depicted can be separate modules, part of a single module, or combined according to any possible combination. For example, the compare block 330 and the diagnostic block 340 can be part of a single module. Any other possible combination is possible.

As described herein, the HWA 10 provides the command based on the input from the driver at the physical system 12 (such as steering wheel). The rack force corresponding to the command is computed by the RWA 20. The computed rack force is applied to the rack 24, for example using a motor, a drive system, and the like. The rack force causes the rack 24, and in turn one or more road wheels of the vehicle 100 to change position. The resulting position is referred to as actual position of the rack 24 (or road wheel).

Figure 4:
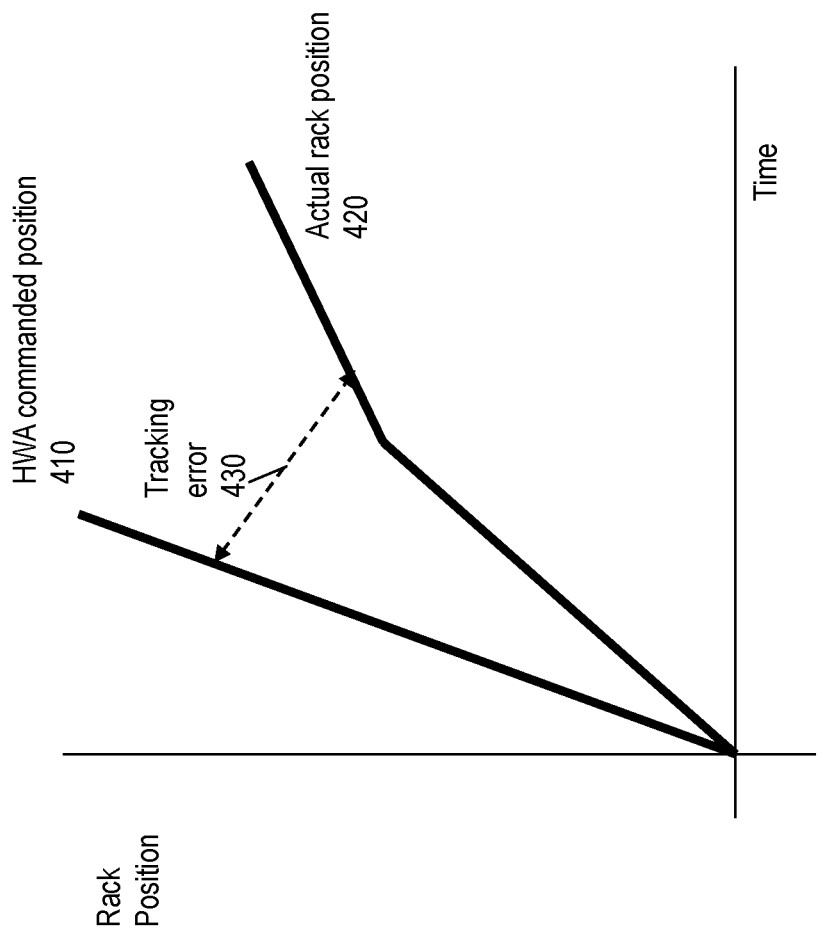
FIG. 4 depicts a typical computation of the tracking error between the actual position and a commanded position.

Typically, the compare block 330 compares the actual position with a desired position according to the command from the HWA 10 to determine a tracking error. FIG. 4 depicts a typical computation of the tracking error 430 between the actual position 420 and a commanded position 410. The commanded position 410 can be a commanded rack position, a commanded road wheel position, or a commanded position for any other component of the physical system 24. The actual position 420 is the measured position of that component, the actual position 420 being measured by a sensor, for example. The commanded position 410 can be calculated using a steering ratio and the command from the HWA 10. A difference between the computed commanded position 410 and the actual position 420 is the tracking error 430. The diagnostic block 340 compares the tracking error 430 with a threshold, which can be a predetermined value. If the tracking error 430 exceeds the threshold, the diagnostic block 340 deems that the SbW system 40 is experiencing a fault condition and issues a notification indicative of the fault condition. In one or more examples, the SbW system 40 is rendered inoperative in such cases. Other types of notifications can include an audio-visual message via a driver-vehicle interface, a haptic feedback via the physical system 12, and/or any other such techniques. However, as described herein, such techniques have a technical problem that the two conditions described herein cannot be separately recognized.

Accordingly, the rack velocity capability module 310 computes a rack velocity capability based on rack force corresponding to the command provided by the HWA 10. The limit block 320 limits the computed position that is based on the commanded position 410 from the HWA 10 using the computed rack velocity capability. Accordingly, a second reference signal is computed by limiting the commanded position using the rack velocity capability. The second reference signal is then provided to the compare block 330 for comparing with the actual position.

Figure 5:
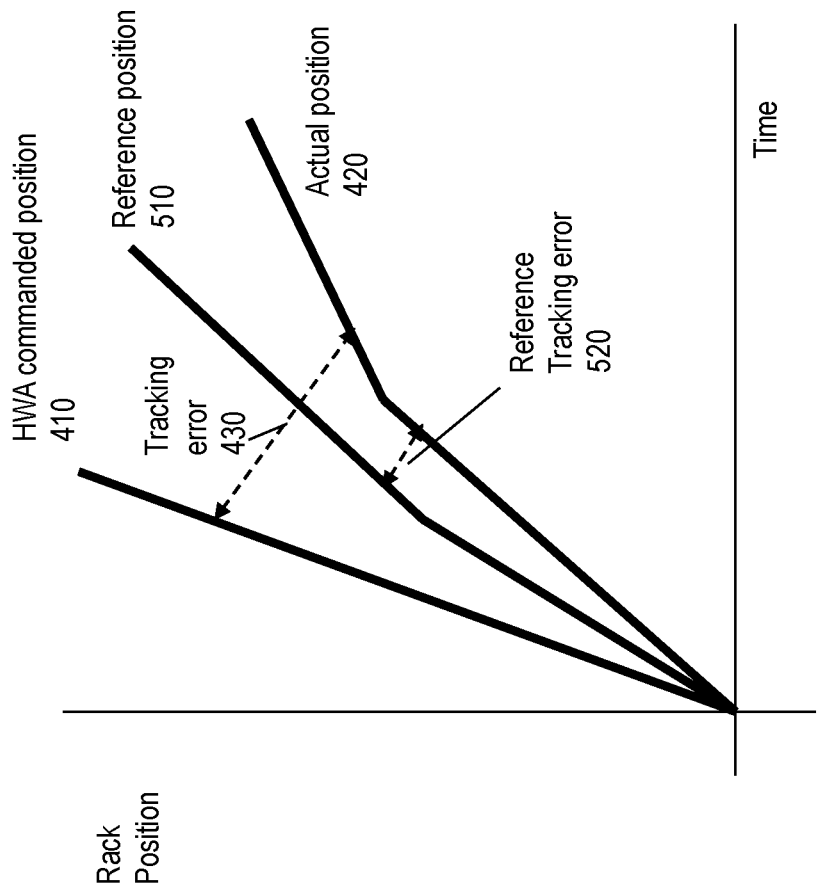
FIG. 5 depicts computation of the tracking error according to one or more embodiments of the technical solutions described herein.

FIG. 5 depicts computation of the tracking error according to one or more embodiments of the technical solutions described herein. As depicted, a reference position 510 is computed by limiting the commanded position 410. Further, the compare block 330 computes a reference tracking error 520 by calculating a difference between the reference position 510 and the actual position 420. The diagnostic block 340 uses the reference tracking error 520 to determine if a fault condition exists in the SbW system 40.

By using the reference tracking error 520 (instead of the tracking error 430), the diagnostic can reliably detect the fault condition, distinguishing from the "out-running" condition described herein.

The rack velocity capability module 310 determines the rack velocity capability using a non-linear function between the rack force and the rack velocity (FIG. 2). In one or more examples, the rack velocity capability module 310 uses a look up table that is accessed using the rack force computed by the RWA 20. For example, the look up table provides a corresponding rack velocity capability value for the rack force that is computed. The limit block 320 subsequently uses the rack velocity capability to limit the commanded position 410 that is computed using the command from the HWA.

Figure 6:
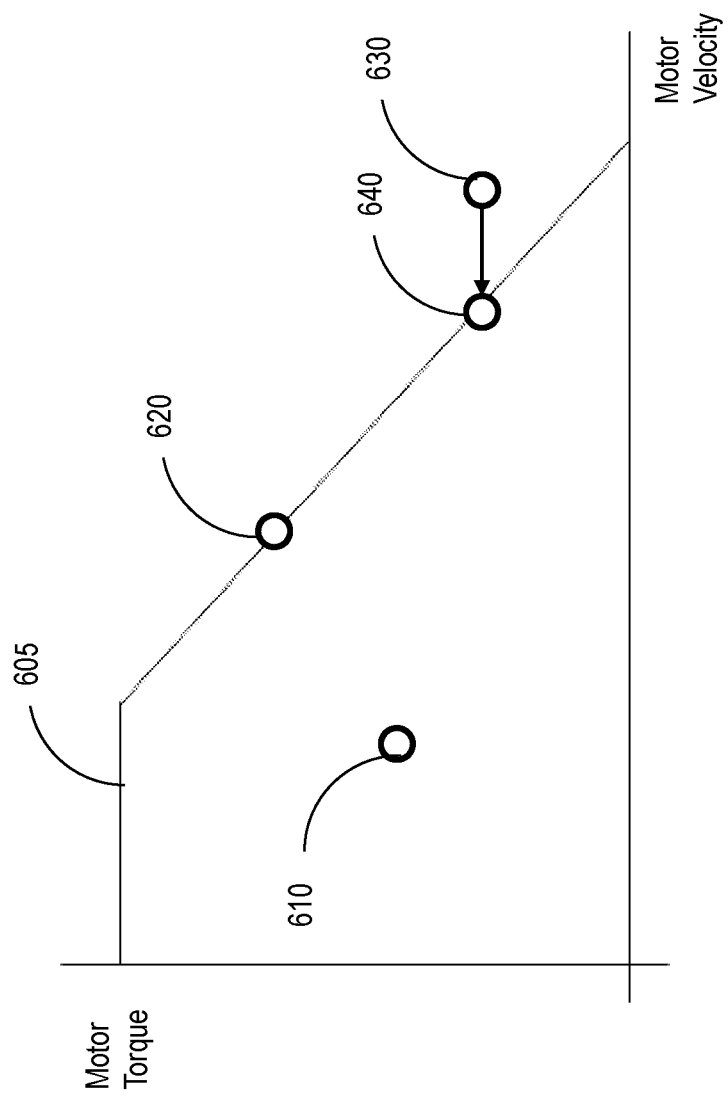
FIG. 6 depicts an example non-linear relationship between the motor torque and the motor velocity according to one or more embodiments.

Alternatively, or in addition, the rack velocity capability module 310 determines the rack velocity capability using a motor torque and a motor velocity of a motor of the RWA 20. FIG. 6 depicts an example non-linear relationship between the motor torque and the motor velocity according to one or more embodiments. The rack force computed by the RWA 20 is converted into a motor torque for the motor of the RWA 20. The motor torque is used to determine a torque command to the motor that causes the rack position to change according to a shaft of the motor. The motor velocity is a velocity at which the motor of the RWA 20 changes position because of the applied motor torque. The conversion of the rack force to the motor torque is based on a kinematic ratio that has a predetermined value and is indicative of a relation between the rack position change and the motor position change. The motor velocity can be determined using a sensor, such as a position sensor that provides position of the motor. In one or more examples, the motor velocity can be determined by differentiating the position measurements from the position sensor. Alternatively, or in addition, another type of sensor may be used.

Here, as depicted, depending on the motor torque and corresponding motor velocity, the rack velocity capability module 310 determines the rack velocity capability. If the motor torque and motor velocity pair corresponds to a point within the predetermined bounds 605 based on the motor torque and motor velocity, the rack velocity capability does not limit the commanded position 410. For example, the point 610 and point 620 in FIG. 6 depict the motor velocity and motor torque pair being within the bounds 605. Instead, if the motor velocity and motor torque pair is outside the bounds, such as the point 630, the commanded position 410 is limited at the bounds 605 by limiting the motor velocity.

Accordingly, instead of the point 630, the point 640 is used, by using a motor velocity corresponding to the point 640 as the rack velocity capability. The rack velocity capability is subsequently used to limit the commanded position 410 as described herein to compute the reference position 510.

Figure 7:
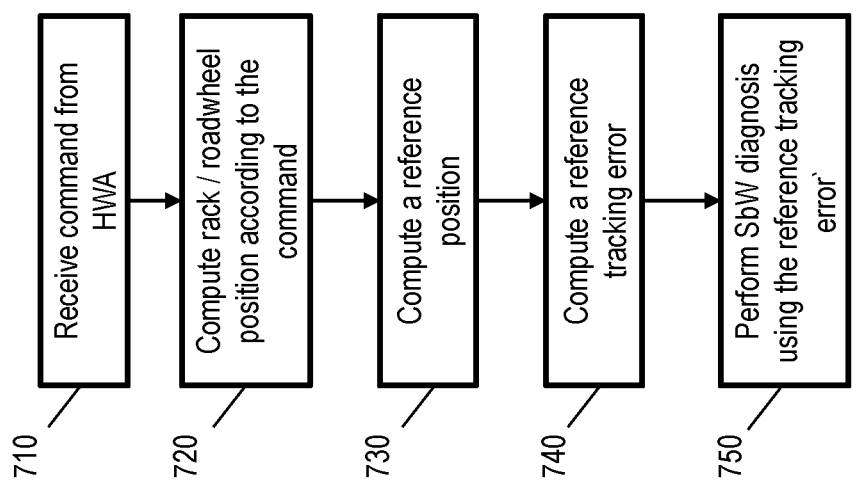
FIG. 7 depicts a flowchart of an example method for performing system diagnosis of a SbW system according to one or more embodiments.

FIG. 7 depicts a flowchart of an example method for performing system diagnosis of a SbW system according to one or more embodiments. The method includes the HWA 10 sending a command to the RWA 20, at 710. The command can be a torque command, a position command, or any other command to indicate the commanded position 410 for the physical system 24, such as the road wheels, rack, etc. The command is based on an input from a driver of the vehicle 100. The driver can be a human operator or an automated drive system.

The method further includes the RWA 20 computing a position for the physical system 24 according to the commanded position 410, at 720. The RWA 20 further positions the road wheel and/or the rack to the actual position 420 according to the computed position. Further, the method includes computing the reference position 510, at 730. Computing the reference position 510 is performed by the rack velocity capability module 310 by limiting a desired position computed using the commanded position 410.

The method further includes computing the reference tracking error 520 using the reference position 510 and the actual position 420, at 740. The reference tracking error 520 can be the difference between the reference position 510 and the actual position 420. The reference tracking error 520 is then used for performing a diagnosis of the SbW system 40 to determine if a fault condition exists, at 750. The fault condition is deemed to be existing if the reference tracking error 520 exceeds a predetermined threshold value. In case of the fault condition, the SbW system 40 can provide one or more notifications to the operator, which can include an audio-visual notification, a haptic feedback notification, an electronic signal, or any other such notifications. Further, the SbW system 40 can be rendered inoperative in case the reference tracking error exceeds a second (larger) threshold.

The one or more embodiments of the technical solutions described herein facilitate diagnosing a SbW system dynamically, at runtime, and provides an improvement over existing techniques by distinguishing between a fault condition and a condition in which an HWA out-runs the RWA, the latter not being a fault condition.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

Having thus described the invention, it is claimed:

1. A steer by wire steering system comprising:
   a handwheel actuator that provides a commanded position for a rack of a vehicle;
   a roadwheel actuator that moves the rack to a rack position based on the commanded position from the handwheel actuator; and
   a processor configured to:
   compute a reference position based on the commanded position;
   compute a reference tracking error based on a difference between the reference position and the rack position; and
   determine a fault condition with the steer by wire system using the reference tracking error.

2. The steer by wire steering system of claim 1, wherein the processor computes the reference position by limiting the commanded position using a rack velocity capability.

3. The steer by wire steering system of claim 2, wherein the processor computes the rack velocity capability using a rack force.

4. The steer by wire steering system of claim 2, wherein the processor computes the rack velocity capability using a motor torque of a motor of the roadwheel actuator.

5. The steer by wire steering system of claim 4, wherein the rack velocity capability is computed using a non-linear relationship between the motor velocity and the motor torque.

6. The steer by wire steering system of claim 4, wherein the processor limits the commanded position to compute the reference position when the rack velocity caused by the commanded position exceeds the rack velocity capability.

7. The steer by wire steering system of claim 1, wherein the processor determines the fault condition in response to the reference tracking error exceeding a predetermined threshold.

8. A method for performing a diagnostic for a steer by wire steering system, the method comprising:
   sending, by a handwheel actuator, a commanded position for receipt by a roadwheel actuator;
   positioning, by the roadwheel actuator, a rack to a rack position based on the commanded position;
   computing, by a processor, a reference position based on the commanded position;
   computing, by the processor, a reference tracking error based on a difference between the reference position and the rack position; and
   determining, by the processor, a fault condition with the steer by wire system using the reference tracking error.

9. The method of claim 8, wherein the processor computes the reference position by limiting the commanded position using a rack velocity capability.

10. The method of claim 9, wherein the processor computes the rack velocity capability using a rack force.

11. The method of claim 9, wherein the processor computes the rack velocity capability using a motor torque of a motor of the roadwheel actuator.

12. The method of claim 11, wherein the rack velocity capability is computed using a non-linear relationship between the motor velocity and the motor torque.

13. The method of claim 11, wherein the processor limits the commanded position to compute the reference position when the rack velocity caused by the commanded position exceeds the rack velocity capability.

14. The method of claim 8, wherein the processor determines the fault condition in response to the reference tracking error exceeding a predetermined threshold.

15. A computer program product comprising a memory storage device having computer executable instructions stored therein, the computer executable instructions when executed by one or more processing units cause the processing units to perform diagnostic of a steer by wire steering system, performing the diagnostic comprising:

positioning, by a roadwheel actuator, a rack to a rack position based on a commanded position from a handwheel actuator;

computing a reference position based on the commanded position;

computing a reference tracking error based on a difference between the reference position and the rack position; and determining a fault condition with the steer by wire system using the reference tracking error.

16. The computer program product of claim 15, wherein the reference position is computed by limiting the commanded position using a rack velocity capability.

17. The computer program product of claim 16, wherein the rack velocity capability is computed using a rack force.

18. The computer program product of claim 16, wherein the rack velocity capability is computed using a motor torque of a motor of the roadwheel actuator.

19. The computer program product of claim 16, wherein the commanded position is limited to compute the reference position when the rack velocity caused by the commanded position exceeds the rack velocity capability.

20. The computer program product of claim 19, wherein the fault condition is determined in response to the reference tracking error exceeding a predetermined threshold.

* * * * *